United States Patent
Burke et al.

(10) Patent No.: US 6,259,865 B1
(45) Date of Patent: Jul. 10, 2001

(54) STEREOSCOPIC BEAM SPLITTER OPTICAL CONVERTER DEVICE FOR VIDEO SYSTEMS

(75) Inventors: Elliot M. Burke; Stephen M. Kurtzer, both of Santa Barbara; Ward F. Rogers, Escalon, all of CA (US)

(73) Assignee: 3-D Video, Inc., Santa Barbara, CA (US)

( * ) Notice: Subject to any disclaimer, the term of this patent is extended or adjusted under 35 U.S.C. 154(b) by 0 days.

(21) Appl. No.: 08/939,448

(22) Filed: Sep. 29, 1997

(51) Int. Cl.[7] .................................................. G03B 35/02
(52) U.S. Cl. ............................. 396/327; 396/335; 352/65
(58) Field of Search ........................................ 396/322, 324, 396/327, 331, 335; 352/62, 63, 64, 65

(56) References Cited

U.S. PATENT DOCUMENTS

| | | | |
|---|---|---|---|
| 1,429,495 | * 9/1922 | Douglass | 352/65 |
| 2,568,327 | * 9/1951 | Dudley | 396/331 |
| 3,903,358 | 9/1975 | Roese | 359/465 |
| 3,990,087 | * 11/1976 | Marks et al. | 396/331 |
| 4,133,602 | 1/1979 | Ihms | 359/464 |
| 4,480,893 | 11/1984 | Fantone | 359/465 |
| 4,681,415 | * 7/1987 | Beer et al. | 396/335 |
| 4,915,497 | * 4/1990 | Loth et al. | 352/60 |
| 4,943,853 | 7/1990 | Femano et al. | 348/42 |
| 5,003,385 | 3/1991 | Sudo | 348/49 |
| 5,007,715 | 4/1991 | Verhulst | 359/465 |
| 5,028,994 | 7/1991 | Miyakawa et al. | 348/49 |
| 5,270,751 | * 12/1993 | Christian | 353/7 |

FOREIGN PATENT DOCUMENTS 2135470A  8/1984 (GB).

* cited by examiner

*Primary Examiner*—David M. Gray
(74) *Attorney, Agent, or Firm*—Michael G. Petit

(57) ABSTRACT

An adapter enables three-dimensional motion photography by means of a single camera, video or film, that includes a single lens system and image pickup. The adapter is engageable to a conventional camera. An optical system within the adapter includes a mirror for detecting a second, distinct perspective of a field-of-view. The two perspective views are orthogonally polarized and applied to a single switchable liquid crystal polarization rotator that is driven by a periodic SYNC signal derived from the camera. A polarization filter receives the output of the rotator which alternately passes perspective views unaltered and rotated by ninety degrees in polarization, providing alternating frames of one or another perspective view to the camera. The stream of alternating perspectives provides a three-dimensional viewing effect when processed by conventional video and film systems.

2 Claims, 5 Drawing Sheets

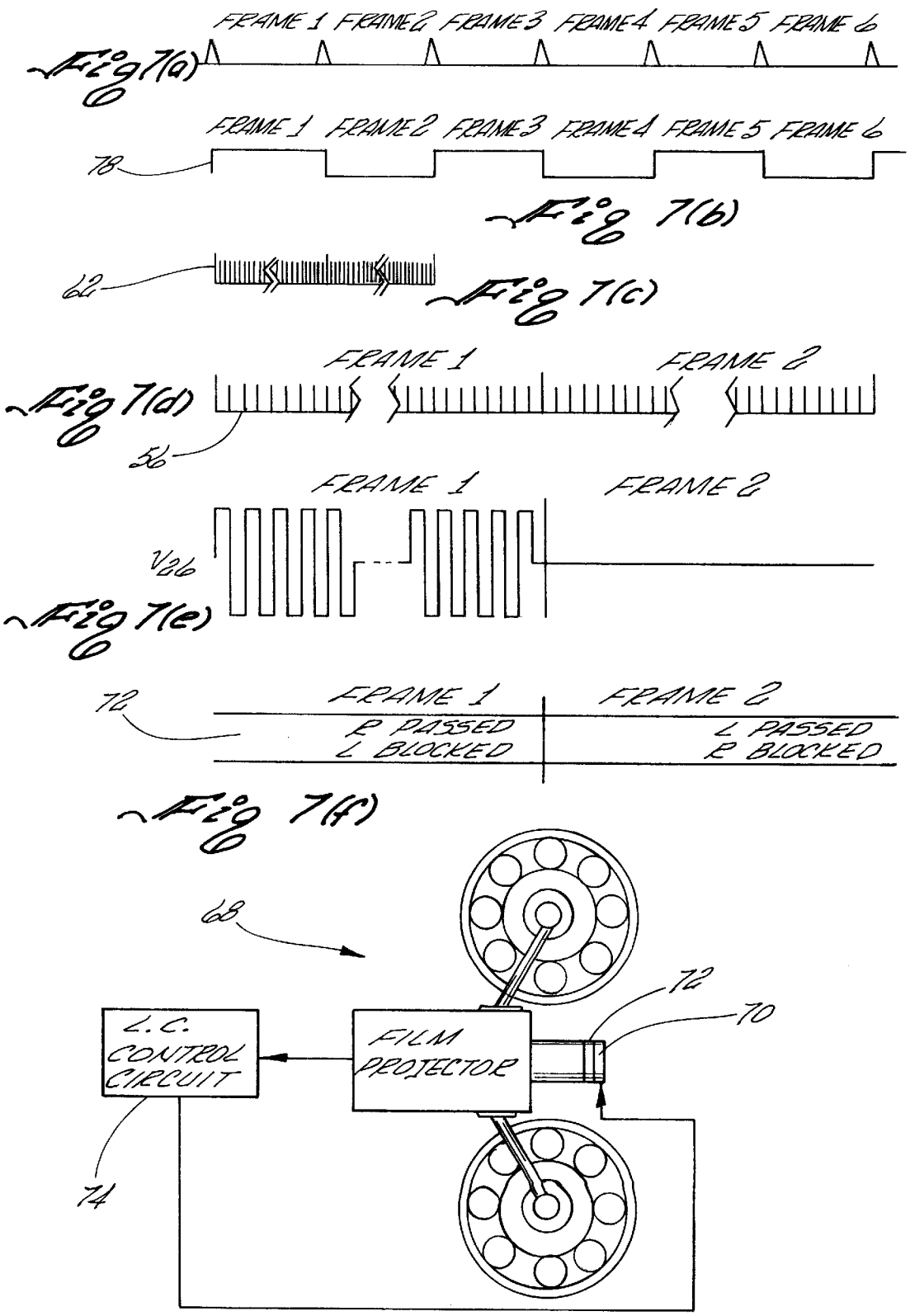

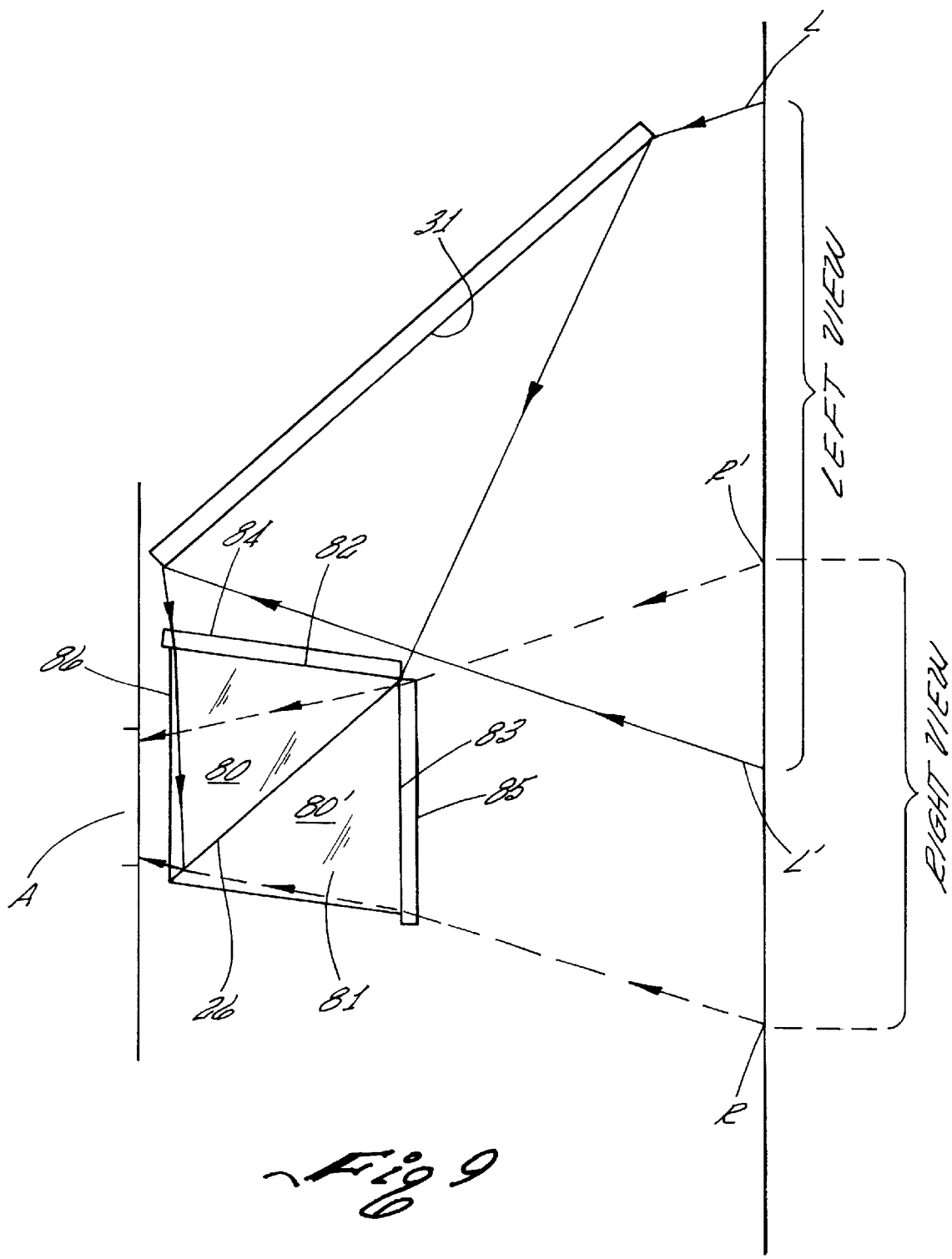

STEREOSCOPIC BEAM SPLITTER OPTICAL CONVERTER DEVICE FOR VIDEO SYSTEMS

BACKGROUND

1. Field of the Invention

The present invention relates to apparatus for use in creating three-dimensionally encoded photographic images. More particularly, the present invention pertains to an adapter for generating such images with a camera having a single lensing system.

2. Description of the Prior Art

Three-dimensional photography adds much to a viewer's experience. In addition to providing added entertainment value, the appreciation of depth within a field-of-view can be essential in camera-assisted procedures. For example, video cameras employed by operating physicians during microsurgery provide much-needed information concerning the front-to-back, in addition to the side-to-side, geometry of an anatomical area.

In the prior art, the creation of a three-dimensional viewing effect on a two dimensional screen has required and relied upon the creation of two two-dimensional parallax inputs that the brain is capable of processing in combination to create a third sensory dimension, depth. In a human being (and for that matter, in most animals), such parallax inputs result as a consequence of physical separation between two simultaneously-operative visual pickups (i.e. the left and right eyes) that enables the viewer to pick up images of a field-of-view from somewhat-different perspectives.

The recording of visual information for subsequent playback in a manner that permits the brain to derive depth involves detecting and, possibly, recording two two-dimensional images of a single field-of-view taken from positions that mimic the relative perspectives of a viewer's right and left eyes. Various projection and playback devices and systems are available to direct the individual images to the viewer's right and left eyes so that the parallax images are essentially simultaneously viewed by the corresponding human pickups and the brain can then derive depth. The various systems of the prior art for recording the requisite pair of two-dimensional parallax images are characterized by pairs of visual processing channels. For example, in video recording systems (e.g. home video cameras of the CAMCORDER type), both separate cameras and cameras that employ a pair of lensing systems and independent pickup devices (such as charge coupled devices) are employed to generate separate right eye and left eye images. The two images are then electronically interlaced in accordance with a recognized video format (e.g. NTSC) for viewing by, for example, a headset or glasses that include out-of-phase shuttering mechanisms to guarantee that only the proper image field is viewed by the wearer's right and left eyes.

Three-dimensional motion film photography employs separate cameras oriented with respect to one another to recreate the relative right and left eye perspectives. The cameras may be bracketed or strapped together at a predetermined angle. The two images are then projected through orthogonally-polarized filters onto a common two-dimensional screen to produce a "ghosted" composite image. By viewing the composite image through a pair of glasses whose right and left lenses are of opposite polarizations (matching the polarizations of the appropriately recorded images), each image is input through the "correct" eye, allowing the viewer's brain to process the received visual information properly.

Recording three-dimensional image information thus has involved both cumbersome and expensive techniques. As a result, the application and development of three-dimensional image recording and film photography have been hampered by production expenses that include systems having multiple expensive components including cameras, lenses and sensors.

SUMMARY AND OBJECTS OF THE INVENTION

It is therefore an object of the present invention to provide apparatus for transforming a received field-of-view into a visual stream suitable for application to a three-dimensional viewing system.

The invention provides an apparatus for transforming a received field-of-view into a three-dimensional image sequence for application to a camera comprising a single image pickup. Such an apparatus includes means for imparting a predetermined angular differential between a first perspective and a second perspective of the field-of-view. Means are provided for imparting orthogonal polarizations to the perspective views. Means are also provided for receiving and sequentially providing the first and second perspective views to the camera.

The preceding and other objects and features of this invention will become further apparent from the detailed description that follows. Such description is accompanied by a set of drawing figures. Numerals of the drawing figures, corresponding to those of the written description, point to the various features of the invention. Like numerals refer to like features throughout both the written description and the drawing figures.

BRIEF DESCRIPTION OF THE DRAWINGS

FIGS. 7(a) through 7(f) comprise a set of timing diagrams for illustrating the operation of the electronic shuttering system of an adapter for use with a film camera; and FIG. 8 is a block diagram of a projection system for use with film generated in accordance with the invention.

FIG. 9 is schematic top view of an optical system employing a parallelepiped prism as a beam splitter in an adapter in accordance with a preferred embodiment of the invention.

DETAILED DESCRIPTION OF THE PREFERRED EMBODIMENT

Figure 1:
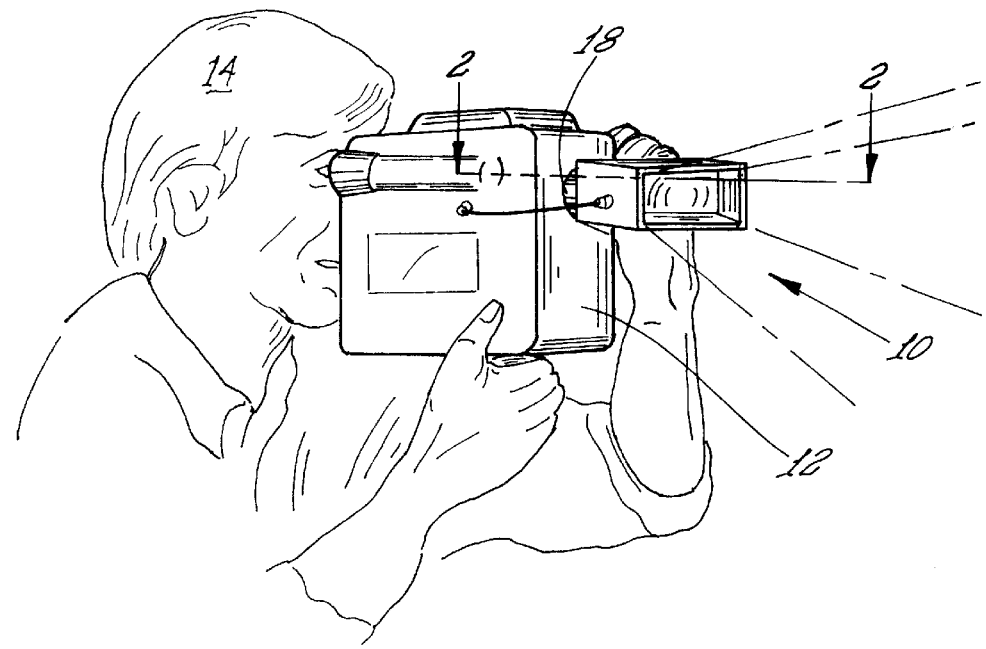
FIG. 1 illustrates a three-dimensional adapter in accordance with the invention as employed for recording a three-dimensional coded image by means of a conventional video camera and recorder.

FIG. 1 illustrates a three-dimensional adapter 10 in accordance with the invention as employed for recording a three-dimensional coded image by means of a conventional hand-held video camera 12. While the description of the invention will first proceed with reference to video, as opposed to film, photography, it should be pointed out that the adapter 10 may, with minor modification, be employed to obtain three-dimensional photography by means of a film camera employing a single lensing system and image detector. Hence, like advantages may be obtained by the invention in the film medium as in video. Various modifications of the video arrangement will be pointed out as the description proceeds so that one may appreciate both the video and film applications.

As shown in FIG. 1, an operator 14 employs the single video camera 12 with the three-dimensional adapter 10 affixed to the lens assembly 18 of the video camera 12 in accordance with the invention. The adapter 10 enables a single operator 14 to record and store images suitable for creation of depth perception within the recorded field-of-view when projected, displayed or otherwise played-back.

Figure 2:
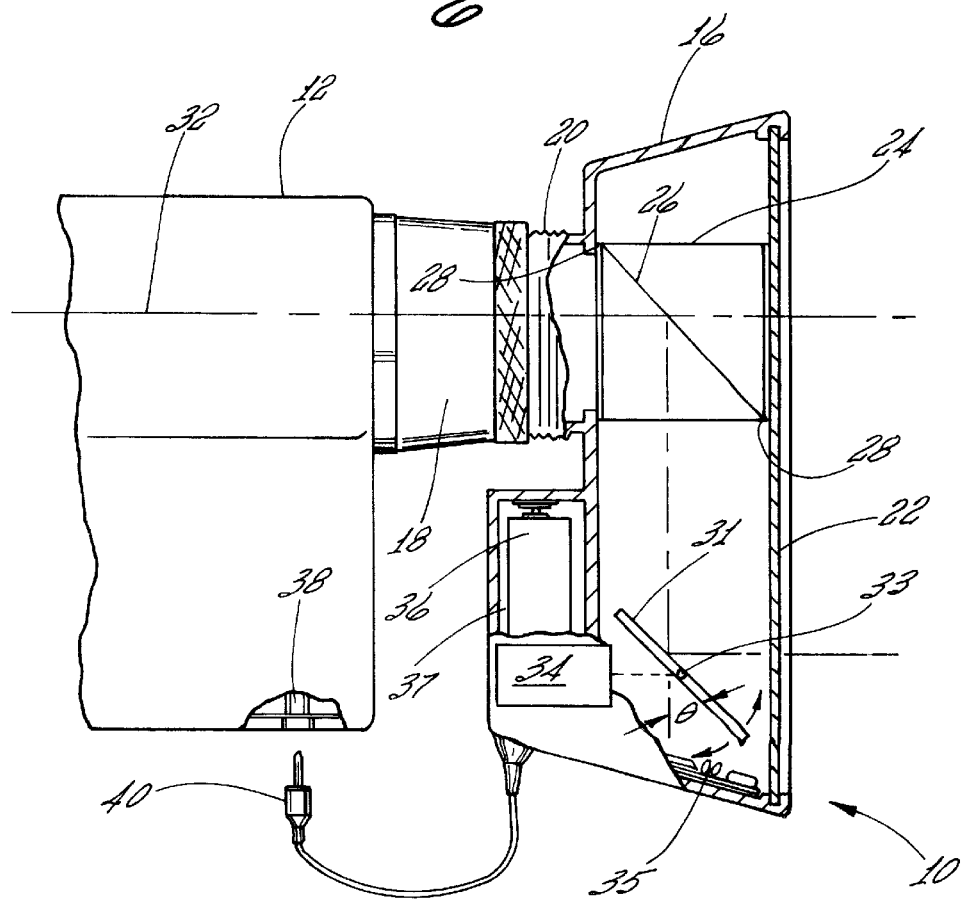
FIG. 2 is a cross-sectional view of the adapter of FIG. 1 taken generally in the direction of line 2—2 of FIG. 1.

FIG. 2 is a cross-sectional view of the adapter 10 of FIG. 1 taken generally in the direction of line 2—2 of FIG. 1. The adapter 10 is shown engaged to the representative video camera 12 with top portions of a housing 16 removed to facilitate comprehension. As can be seen, the adapter 10 is coupled to the front of the lens assembly 18 of the video camera 12 by means of a threaded coupling 20. A glass window 22 is provided at the front of the adapter 10. The interior of the adapter housing 16 accommodates both an optical system and associated electronics. A glass cube 24 houses a beamsplitter layer 26. The cube 24 is positioned so that the layer 26 intercepts both the left and right eye views generated by the adapter 10. The cube 24 lies between a polarizer 29 that may comprise a polarizing film fixed to the front vertical surface of the cube 24 and a switchable polarization rotator 28 that contacts the rear surface of the cube 24. A second polarizer 30 (shown in FIG. 3) is parallel to, and may comprise a polarizing film fixed to the bottom surface of the cube 24. It is an essential feature of the present invention that the first polarizer 29 and the second polarizer 30 are arranged so that light, upon passage through the first polarizer 29, assumes a first linear polarization while, after passage through the second polarizer 30, it assumes a second, orthogonal linear polarization.

A mirror 31 completes the gross optical system of the adapter 10. The mirror 31 is so positioned within the adapter housing 16 and with respect to the optical axis 32 of the lensing system of the attached video camera 18 that the image received through the window 22 upon the mirror 31 will vary from that transmitted to the left shutter by a predetermined angle to provide a "right eye perspective" that differs from a "left eye perspective" in a way that mimics human vision. It has been found that a 1.5 degree angle of parallax is appropriate to obtain convergence between the right and left eye perspectives at a distance of about three meters, the distance at which the primary subject is commonly located within a camera's field-of-view. To obtain such a setting the mirror 31 is oriented so that the angle θ of FIG. 2 is 46.5 degrees (45 degrees plus 1.5 degrees). The angle θ is controllable by rotating the mirror 31 about a central post or rod 33 rotatably mounted within the adapter housing 16. A conventional mirror drive 34 such as a hand crank or a motor may be engaged to the central post or rod 33 to actuate rotation thereof. In this way, the angle θ of the mirror 31 may be adjusted, even during taping (or filming), to provide subtle three-dimensional effects and to "correct" the system for any variation in the distance between the cameraman and the primary visual subject.

The electronics of the adapter 10 serves to regulate the passage of a visual stream through the adapter 10 and to the camera 12. Such electronics is arranged upon a circuit board 35 that is fixed to a side panel of the adapter housing 16. A battery 36 stored within a battery compartment 37 of the housing 16 energizes the circuitry mounted upon the circuit board 35 to control the operation of the light shutter 28 as described below.

The circuitry of the adapter 10 comprises, in part, a standard video stripper circuit for extracting the SYNC pulses from a video-format signal. The adapter 10 receives such video signal by tapping the "VIDEO OUT" terminal 38 of the camera 12 through a plug connector 40.

Figure 3:
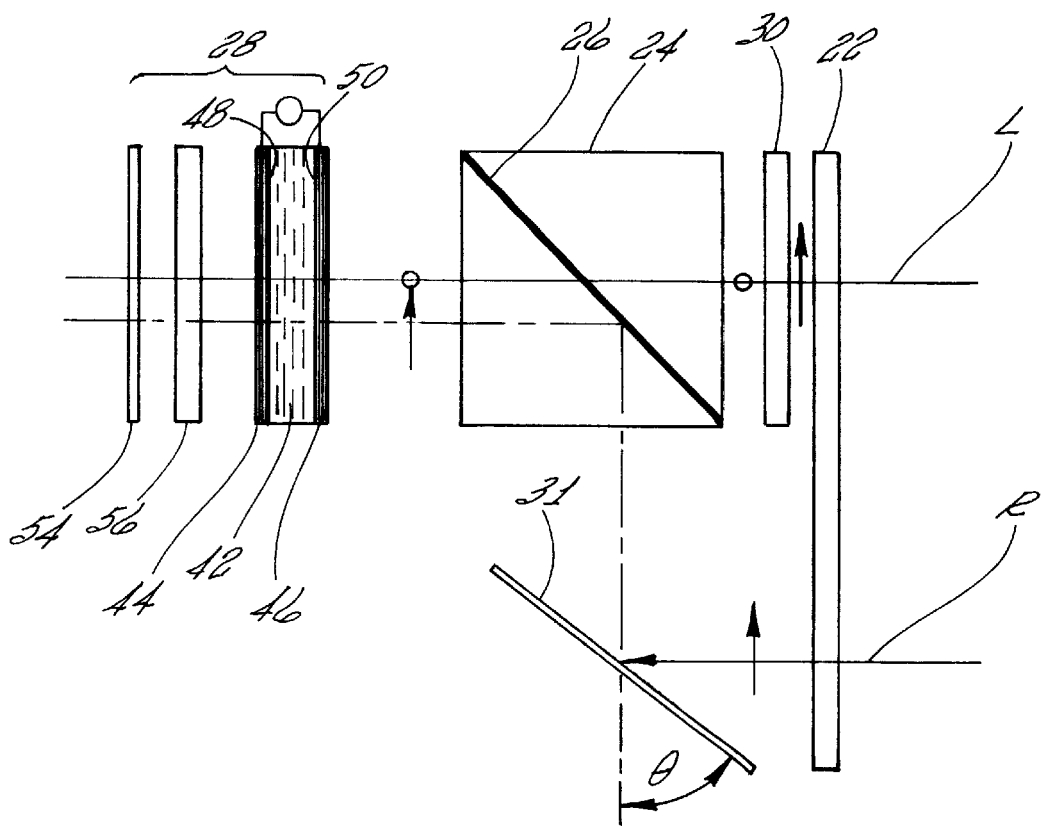
FIG. 3 is a schematic view of the optical system of an adapter in accordance with the invention.

FIG. 3 is a detailed optical schematic view of elements of the adapter 10 for illustrating the operation thereof. Referring first to the switchable polarization rotator 28, this device includes a layer 42 of liquid crystal material that is sandwiched between opposed glass plates 44 and 46. The layer 42 preferably comprises nematic liquid crystal material with the inner surfaces of the glass plates 44 and 46 appropriately treated so that the liquid crystal material is maintained in the twisted nematic mode. As such, the polarization of light passing through the layer 42, when quiescent (i.e. no excitation signal applied), is rotated by ninety degrees. When activated by an electrical signal (generally a.c.) applied between a counterelectrode 48 and an active electrode 50 fixed to the inner surfaces of the plates 44 and 46 respectively, light passes through the layer 42 without its polarization affected. A quarter wave plate 56 for adjusting image chromaticity and a polarization filter 54 that acts as an analyzer complete the optical structure of the portion of the adapter 10 for processing images received from the cube 24.

In operation, a ray "L" represents the path of a ray of the "left eye image" received by the adapter 10 while "R" represents a ray of light of the "right eye image" received. As mentioned above, the specific right eye perspective (with respect to the left eye perspective) or parallax desired is determined by the angle θ of the surface of the mirror 31 with respect to the face plate 22.

The light rays L and R are unpolarized upon passing through the glass face plate 22. Thereafter the L image passes through the first polarizer, attaining a first linear polarization prior to entering the cube 24. (The direction of polarization of light passing along a ray or path is indicated in FIG. 3 by either a small transverse arrow or a circle. The two symbols refer to orthogonal directions of polarization.) Conversely, R image light, upon passage through the face plate 24, is reflected from the surface of the mirror 30 toward the cube 24 and beamsplitter 26. Prior to entering the glass cube 24, the R image light passes through the second polarizer 30. After passage through such polarizer 30, the R image light is linearly polarized with polarization orthogonal to the L image light.

Although shown with separation distances therebetween in FIG. 3, the existence of intimate contact between the optical elements traversed by the L image effectively transfers the L image as incident upon the face plate 22 to the lens of the camera 12. Additionally, the intimate contact between the switchable polarization rotator 28 and the glass cube 24 assures that the R image is also essentially input to the lensing system of the camera 12 as received through the face plate 22. The essentially "solid" optical system within the adapter 10 minimizes the degree of convergence of the rays defining the L and R images within the adapter due to the refractive index of the glass. This permits essentially the entire field of view received at the adapter 10 to be transferred to the lensing system of the camera 12.

Returning to the processing of the R and L images within the optical system of the adapter 10, the internal beamsplitter coating 26 of the glass cube 24 acts to pass the L image through while reflecting the R image. Hence, after passage through the glass cube 24, L and R images of orthogonal polarizations are received at the front window 46 of the switchable polarization rotator 28.

It is a property of the layer of twisted nematic mode liquid crystal material 42 that, when quiescent, the polarization of light passing therethrough is rotated by ninety degrees while, when activated (generally, by the imposition of an a.c. signal), no change in polarization occurs. The polarization filter 54 passes light of preselected polarization. Either of the two orthogonal polarization modes of the L and R images is suitable. Accordingly, the image having a polarization, upon exiting the glass cube 24, that is the same as the polarization selectivity of the filter 54 will pass through the liquid crystal polarization rotator 28 when the layer 42 of liquid crystal material is actuated by the imposition of an a.c. electrical signal. Conversely, when no signal is applied and, thus, the polarization of that particular image is rotated by ninety degrees upon passage through the quiescent layer 42, the filter 54 will block the transmission of that image to the camera lensing system. The orthogonally-polarized image (containing the other perspective view) can only pass through the filter 54 after a rotation in polarization of ninety degrees. Therefore, that image is blocked by the filter 54 when an a.c. signal is applied across the electrodes 48 and 50 and it will pass through the filter 54 only after its polarization is rotated (i.e. no signal applied). Thus, it can be seen that the arrangement of the adapter 10 requires only a single liquid crystal polarization rotator to generate a sequence of images that alternates between right and left eye perspective views.

Figure 4:
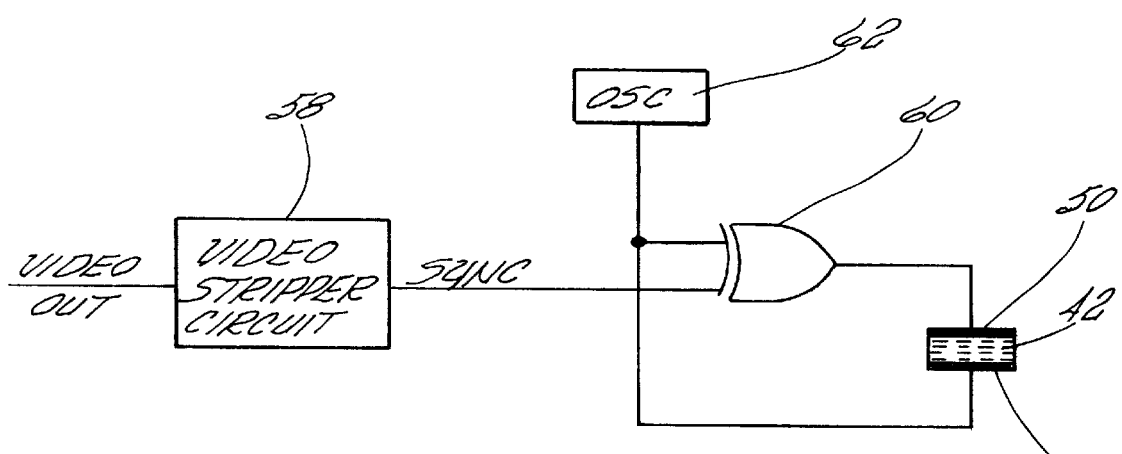
FIG. 4 is a circuit schematic diagram of the electronic shuttering system of an adapter suitable for use with a video camera.

FIG. 4 is a circuit schematic diagram of the electronic shuttering system of an adapter suitable for use with a video camera. As mentioned earlier, the electronic system is, in part, mounted upon a circuit board 35 within the adapter housing 16. While the system illustrated in FIG. 4 is designed for use with a video camera and is based upon the optical system of FIG. 2, it will become apparent from the discussion that substantially the same system and operational principles, with minor modifications, are suitable for an adapter for a film camera.

Referring back to FIG. 4, the video output of the camera 12 (VIDEO OUT signal), tapped at 38 by means of the plug connector 40, is first applied to a conventional video stripper circuit 58. The stripper circuit 58 is a standard modular accessory that derives a series of SYNC pulses, each indicating the beginning of a new field of information within the video signal. In a standard video format such as NTFC, the video signal that is input to the gun of a cathode ray tube (CRT) is formatted to contain video information consistent with the scanning of the video display raster in two interlaced "fields" that, in combination, define a video "frame". This is in contrast to a frame of film which is not scanned and thus the concept of interlaced fields has no application in film. Each video field is typically scanned in 1/60 second with, for example, the field of odd-numbered raster lines scanned during the first 1/60 second and the interfaced field of even-numbered raster lines scanned during the second 1/60 second. Thus a full frame of video is displayed in 1/30 second.

In contrast, in a film camera, a shutter pulse stream permits one to "slave" together various optical effect generators. Such a pulse stream is typically of 24 Hz frequency corresponding to the standard film format of 24 frames per second.

Returning to FIG. 4, the output of the stripper circuit 58 is applied to exclusive-OR gate 60. An oscillator 62 provides the other input to the gate 60. In addition to providing an input to the gate 60, the output of the oscillator 62 is conductively-coupled to the counter-electrode 48 of the liquid crystal polarization rotator 28.

Figure 5A:
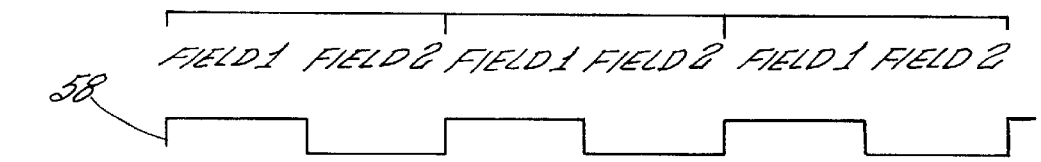
FIGS. 5(a) through 5(e) comprise a set of timing diagrams that illustrate the operation of the electronic shuttering system of an adapter for a video camera.
Figure 5B:
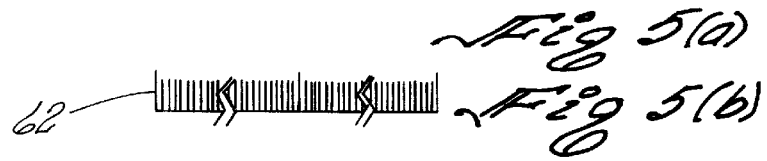

The active electrode 50 receives the output of the exclusive-OR gate 60. FIGS. 5(a) through 5(e) comprise a set of timing diagrams for illustrating the operation of the above-described electronic shuttering system for a video camera adapter. Referring first to FIG. 5(a), a square wave of period 1/30 second is output from the video stripper circuit 58. As mentioned earlier, the circuit 58 extracts a square wave, comprising a train of SYNC pulses, from a standard video output. The duration of each pulse, as well as the duration of time between pulses is, of course, 1/60 second. This corresponds to the time required to record (and display) a field of a video frame. FIG. 5(b) illustrates the output of the oscillator 62. As mentioned earlier, the oscillator 62 generates a high-frequency square wave (e.g. 10 kHZ). It will be seen that the high frequency of the oscillator pulses, greatly exceeding that of the stream of SYNC pulses from the video stripper circuit 58, results in the application of an a.c. voltage across the layer of liquid crystal material 42, activating it to clarity.

Figure 5C:
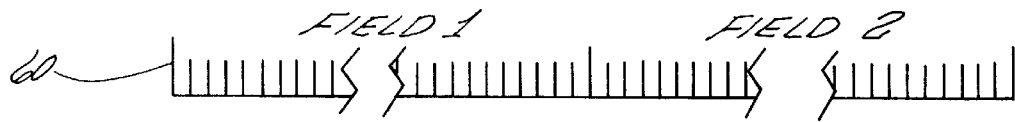
Figure 5D:
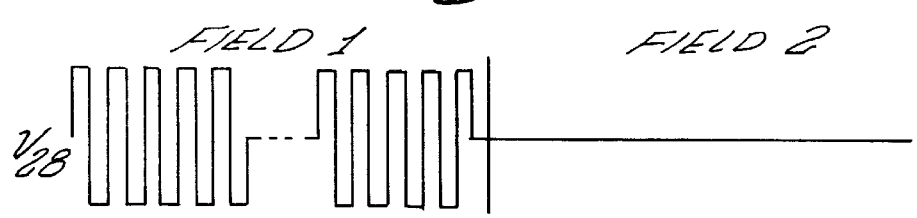

FIG. 5(c) is a waveform of the output of the exclusive-OR gate 60. The time scale of the waveform of FIG. 5(c) is greatly expanded from that of the preceding diagram, with the diagram illustrating the output of the exclusive-OR gate over only a single period of the SYNC signal received from the video stripper circuit 58. As indicated, each period of a SYNC signal comprises one video frame that encodes two interlaced video fields (indicated as "Field 1" and "Field 2").

As can be seen, during the first 1/60 second (Field 1) the output from the video stripper circuit 58 is high. Adopting, as a convention, that an exclusive-OR gate outputs a high output only when its inputs differ, then, for the duration of a pulse from the stripper circuit 58, pulses are output from the gate 60 in a stream of the same frequency, but out-of-phase with, the high frequency pulse stream from the oscillator 62.

Figure 5E:
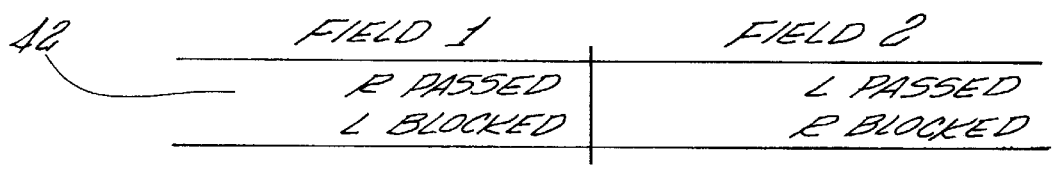

The active electrode 50 receives the output of the exclusive-OR gate 60 at the same time that the counterelectrode 48 receives the output of the oscillator 62. As a result of the out-of-phase relationship between the signals applied to the opposed electrodes of the rotator 28, an a.c. voltage $V_{28}$ (illustrated in FIG. 5(d)), whose peak-to-peak amplitude is double that of the pulses from the oscillator 62, appears across the layer of liquid crystal material 42 for the (1/60 second) duration of Field 1. As indicated in FIG. 5(e), such a.c. voltage disorients the alignment of the molecules of the layer 42 whereby polarized light passes therethrough without any change in polarization during video Field 1. Assuming that the polarization filter 54 is preselected to pass p-polarized light, the L image light emergent from the glass cube 24 is s-polarized and the R image light is p-polarized, then the p-polarized R image will pass through the filter 54 to the camera lens system while the s-polarized L image light is blocked during Frame 1.

The above-described process is reversed during the second 1/60 second period (Field 2) when the output from the video stripper circuit 58 goes low. The high frequency stream of pulses from the oscillator 62 produces an output of frequency and phase unchanged from the output of the oscillator 62. The pulses of the voltage waveforms applied to the active electrode 50 and to the counterelectrode 48 accordingly arrive in-phase during Field 2. Thus, no voltage difference is applied across the layer of liquid crystal material 42. During Field 2 the molecules of the layer of liquid crystal material 42 remain quiescent and aligned. Thus, the polarization of light is twisted by ninety degrees upon passage therethrough. Again, assuming inputs of s-polarized L light and p-polarized R light and a p-oriented polarization filter 54, the L light image (rotated to p-polarization) now passes through the adapter 10 and to the lens system of the camera 12 while the R image light, rotated to s-polarization, is blocked by the filter 54.

The above-described sequence is repeated over every 1/30 second video frame. Referring to the previous figures, it is thus seen that right and left eye perspective views are accordingly transmitted to the image pickup within the video camera every 1/60 second in accordance with standard video protocols. Thus, without modification, the internal image sensor of the camera (e.g. a charge-coupled-device (CCD)), sequentially receives right and left eye perspectives of the field-of-view. Without modification to the readout and detection mechanisms of a standard camera, the images picked up by that camera will then provide a video signal which, when applied to a display (perhaps after recordation onto videotape) produces interlaced left eye perspective and right eye perspective fields suitable for viewing by a commercially-available viewing system such as a pair of shuttered eyeglasses or a three-dimensional headset to produce the desired three-dimensional viewing sensation.

Figure 6:
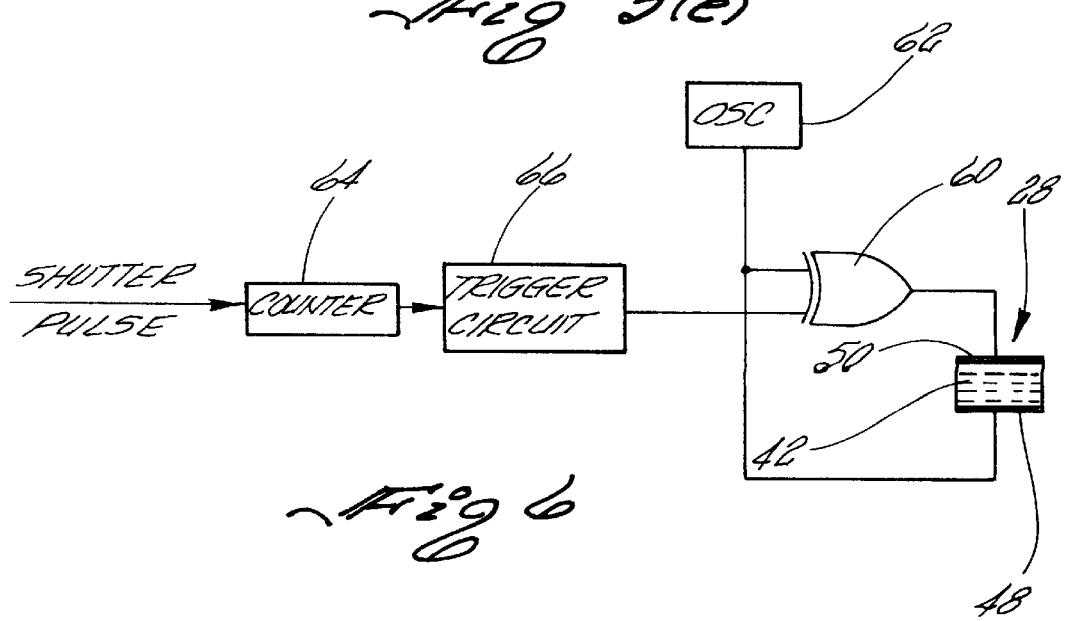
FIG. 6 is a circuit schematic diagram of the electronic shuttering system of an adapter for use with a film camera.

FIG. 6 is a schematic diagram of the electronic shuttering system of an adapter suitable for use with film, as opposed to video, cameras. With certain minor exceptions, the electronic shuttering system of FIG. 6 corresponds to that of a video camera adapter. For this reason, elements of the video camera adapter that correspond to those of an adapter for a film camera are given the same numerals as in FIG. 4.

The primary distinction between the role of an adapter for use with a film, as opposed to a video, camera derives from the different processes employed in film and video photography. As discussed earlier, while a video camera is arranged to convert an input image into a video signal to then re-create the image on a raster through the scanning of interlaced 1/60 second video fields, a film camera captures a moving image by exposing a series of still images onto a strip of film. Conventionally, twenty-four (24) still images are photographed per second. This requires that the strip of unexposed film be advanced by means of a film transport mechanism, then held still and exposed by means of a shutter, the process recurring twenty-four times per second. Numerous operations, including the synchronization of picture with sound, require the use of a common signal, known as a "shutter pulse" for synchronization. The shutter pulse waveform comprises a series of pulses separated by 1/24 second that directs the film transport mechanism, in coordination with the shutter, to create a sequence of twenty-four still images per second.

Referring to the schematic diagram of FIG. 6, a counter 64 receives the shutter pulse waveform from the film camera. A trigger circuit 66 receives the least significant bit of the counter 64. The trigger circuit 66 outputs a pulse of 1/24 second duration every time the least significant bit from the counter 64 is toggled from "0" to "1" (or vice versa). As can be seen, the remainder of the circuitry for controlling the shuttering of the optical system of an adapter for a film camera is identical to the corresponding structure of the video camera adapter illustrated in FIG. 4.

FIGS. 7(a) through 7(f) comprise a series of waveforms for illustrating the operation of the electronic shuttering system of FIG. 6. As can be seen, FIG. 7(a) comprises a series of pulses spaced 1/24 second from one another. The time between two adjacent shutter pulses is employed by the camera to (1) advance the film, (2) open the shutter to expose the film and (3) close the shutter. Thereafter, this process is repeated upon the arrival of the next shutter pulse. Accordingly, the periods between pulses are marked "Frame 1", "Frame 2", etc. in FIG. 7(a) with each frame indicating the exposure of a distinct still image of the field-of-view.

FIG. 7(b) is a diagram of the output of the trigger circuit 66. As mentioned earlier, the trigger circuit 66 is tied to the stage of the least significant bit stored in the counter 64 and arranged to trigger a 1/24 second duration pulse upon detection of a predetermined transition in the state of that stage. For example, as shown in FIG. 7(b), a pulse is triggered at the beginning of each odd-numbered frame. That is, the trigger circuit 66 outputs a pulse whenever the least significant bit of the count goes from even to odd (0 to 1). For purposes of the invention, the opposite transition could be employed as well.

FIGS. 7(c) and 7(d) correspond exactly to FIGS. 5(b) and 5(c) with the following exceptions. First, the expanded time scale of FIG. 7(d) is grouped into two film frames corresponding to the exposure of adjacent images onto an advancing strip of film whereas the pulse stream of FIG. 5(c) is grouped into two video fields corresponding to the scanning of a single video frame. This reflects the differing natures of video and film photography discussed above. Assuming that the output of the oscillator 60 is a 10 kHz pulse stream, each of the 1/60 second video fields will contain or span 166.67 oscillator pulses while each 1/24 second film frame spans 416.67 pulses.

As in the case of the adapter for a video camera, the result of the application of pulses to the liquid crystal polarization rotator 28 is the production of waveform $V_{28}$ as shown in FIG. 7(e) that includes periodic segments of alternating current. As shown in FIG. 7(f), the staggered application of a.c. signals to the liquid crystal layer 42 results in alternating 1/24 second periods of quiescence and activation of the liquid crystal material. As before, this corresponds to alternating periods during which the light passing therethrough is rotated by ninety degrees in polarization and periods in which it passes through without rotation. Adopting the same conventions and assumptions with regard to the R and L images and the filter 54 as were employed with respect to the video camera example, the adapter 10 will pass alternating R and L images to the lens systems of a film camera. As the polarization filter 54 is assumed to pass only p-polarized light, the frames recorded by the film camera are all of the same polarization. As conventional means for viewing three-dimensional film consist of eyeglasses with orthogonally-polarized lenses, a somewhat-modified projection system is employed to adapt three-dimensional film generated in accordance with the invention to viewing by such means. This is accomplished by means of projection apparatus disclosed in FIG. 8. As shown, a projector 68 includes a switchable liquid crystal polarization rotator 70 mounted to a front window 72. A circuit 74, similar to that of FIG. 5, is provided which includes an oscillator for generating an a.c. waveform for selectively exciting the layer of liquid crystal material of the rotator 70. A SYNC signal from the projector 68 triggers and suppresses the inputting of the a.c. signal. The rotator 70 preferably includes a layer of twisted nematic mode liquid crystal material whereby light passing therethrough is either twisted by ninety degrees (quiescent state) or unchanged in polarization. The SYNC signal, derived from the detection of the travel of frames of film through the projector 68, causes an "a.c. field" to alternate within a "no field" condition across the liquid crystal in coordination with the projection of alternate frames of film. As such alternate frames comprise right and left eye images, one perspective is projected as s-polarized light and the other as p-polarized light. Thus, the projection system of FIG. 8 renders film generated in accordance with the invention suitable for three-dimensional viewing with conventional polarized glasses.

Notwithstanding the advantage of compactness offered by the adapter disclosed above, the field of view can be further widened without vignetting the scene by employing the preferred optical system shown in FIG. 9. Widening the field of view is accomplished by fusing two parallel views, $L-L^1$ and $R-R^1$ in a form which has a wider field of view than can be obtained with the dual prismatic cubic beam splitter 24 shown in FIG. 3.

FIG. 9 is a detailed schematic top view illustrating the configuration of the optical elements in the preferred embodiment of the adapter of the present invention. A pair of optically transparent prisms 80 and $80^1$ are affixed to one another by means of a beam splitter layer 26 disposed therebetween to form a parallelepiped beam splitting prism 81 (hereinafter alternatively referred to as the beam splitter). The beam splitter 81 has a left view entrance surface 82 and a right view entrance surface 83 having optical shutters 84 and 85 disposed adjacent and parallel thereto respectively. An exit surface 86 of the beam splitter 81 is disposed adjacent to a camera lens (not shown) having a light receiving aperture A. A mirror 31 reflects extreme rays of light L and $L^1$ defining the left field of view to impinge upon the left view entrance surface 82 of the beam splitter 81 after traversing optical shutter 84. Extreme rays of light defining the right view traverse an optical path represented by the dotted lines R and $R^1$. The beam splitter 81, due to its high index of refraction and parallelepiped shape redirects rays L and $R^1$ in such a manner that they are superimposed as they exit the exit surface 86 of the beam splitter. Similarly R and $L^1$ are superimposed as they emerge from the beam splitter's exit surface to enter the aperture A of the camera lens (not shown).

It is desirable to minimize the optical path for both the direct (right) and indirect (left) field of views because such an arrangement reduces the width between the divergent extreme rays in each view resulting in a wide field of view without vignetting. The optical beam splitter 81, which has relatively high index of refraction, has the shape of a parallelepiped instead of the cube described earlier. In the optical configuration shown in FIG. 9, ray $L^1$ must cross $R^1$ outside of the beam splitter 81 in order to enable the optical converter device to view the camera lens' entire wide angle field of view. The high index of refraction of the beam splitter 81 effectively narrows the necessary width of the entrance surfaces of the prism. The surface defined by the beam splitter layer 26 is inclined at an angle greater than 45° with respect to the plane of the exit surface 86 of the beam splitter 81. This causes the ray reflecting from the beam splitter layer 26 closest to the exit surface 86 to emerge from the exit surface to enter the camera lens at a smaller angle relative to the optical axis of the camera lens than is possible with a cubic beam splitter. This enables the edge of the reflecting mirror 31 to be spaced further from the front surface of the camera, providing a wider angle of acceptance for the camera lens and enabling the exit surface of the beam splitter to be positioned close to the camera lens. This arrangement provides the shortest optical path between the camera lens and the optical converter device (adapter). The tilt of the left entrance surface 82 allows the (offset) reflecting mirror 31 to be positioned closer to the beam splitter 81 thereby shortening the optical path and enabling the size of the reflecting mirror 31 to be reduced while still accepting a wide field of view Thus, it is seen that the present invention provides adapters that are suitable for use with standard video and film cameras. Adapters in accordance with the invention provide both types of cameras, without internal modification, with a means for generating images that can be processed by existing three-dimensional viewing systems, also without modification. By employing the teachings of this invention, one can avoid the substantial costs associated with present-day three-dimensional methods and apparatus.

While the present invention has been described with reference to its presently preferred embodiment, it is not limited thereto. Rather, this invention is limited only insofar as defined by the following set of patent claims and includes within its scope all equivalents thereof.

What is claimed is:

1. An apparatus for transforming a received field-of-view into a three-dimensional image sequence for application to a camera having a single image pickup, said apparatus comprising, in combination:
   (a) means for imparting a predetermined angular differential between a first perspective and a second perspective of said field-of-view;
   (b) means for imparting orthogonal polarizations to said perspective views; and
   (c) means for receiving and sequentially providing said first and second perspective views to said camera;
   and wherein said means for imparting a predetermined angular differential comprises:
      (i) a beamsplitter comprising a beamsplitter layer mounted diagonally within an optically transparent material having the form of a parallelopiped which parallelopiped is non-cubic; and
      (ii) a planar mirror mounted at said predetermined angular differential with respect to said beamsplitter layer.

2. The apparatus of claim 1 wherein said optically transparent material is glass.

* * * * *